(No Model.)
I. L. ROBERTS.
APPARATUS FOR MANUFACTURING CAUSTIC ALKALI.
No. 522,617. Patented July 10, 1894.
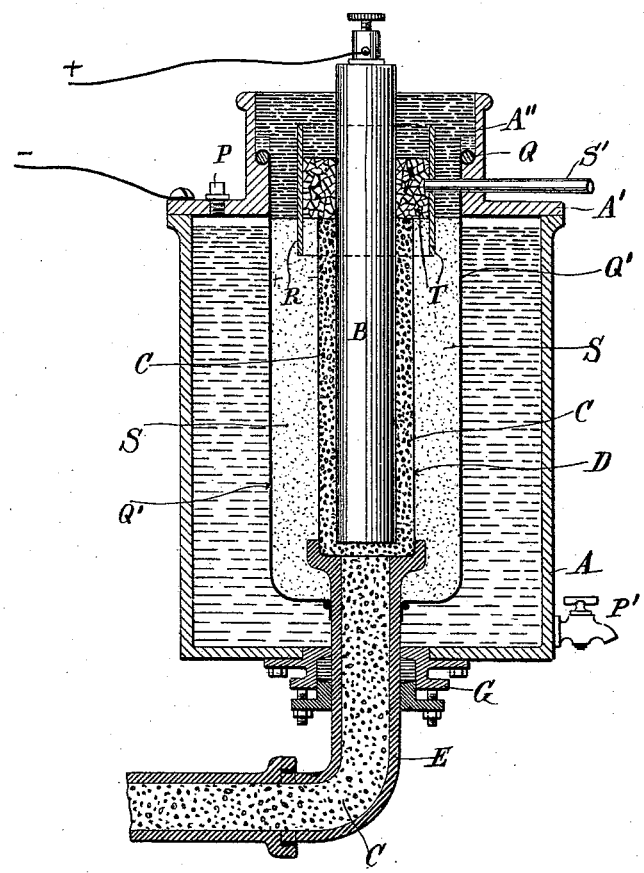
Witnesses:
Raphaël Netter
Ernest Hopkinson
Isaiah L. Roberts Inventor
by Duncan & Page,
Attorneys.

UNITED STATES PATENT OFFICE.

ISAIAH L. ROBERTS, OF BROOKLYN, NEW YORK.

APPARATUS FOR MANUFACTURING CAUSTIC ALKALI.

SPECIFICATION forming part of Letters Patent No. 522,617, dated July 10, 1894.

Application filed November 25, 1891. Renewed February 1, 1894. Serial No. 498,801. (No model.)

*To all whom it may concern:*

Be it known that I, ISAIAH L. ROBERTS, a citizen of the United States, residing at Brooklyn, in the county of Kings and State of New York, have invented certain new and useful Improvements in Apparatus for Manufacturing Caustic Alkali, of which the following is a specification, reference being had to the drawing accompanying and forming a part of the same.

In the production of caustic soda by the electrolytic decomposition of a solution of chloride of sodium, I have employed between the electrodes in the decomposition tank various forms of diaphragm or partition composed of or containing materials of such a nature that the said diaphragms are rendered impervious under normal conditions to the solutions and fluids contained in the apparatus, without preventing or impairing the action of electrolysis. I have found, however, in practice, that practically all of the materials that are most available for use in such diaphragms contain organic matter and impurities, the presence of which is objectionable for various reasons.

In the ordinary forms of apparatus which I employ, the anode is composed of carbon and sulphur, the latter being used as a binding agent, and this is surrounded by a mass of pulverized anthracite coal contained in a suitable bag or receptacle. In this form of the apparatus more particularly I have found that sulphuric acid is formed, and also other compounds such as chlorides and sulphates of aluminium, iron and calcium, which are presumably due to the chemical action of the above and other acids upon such impurities as may exist in the material used for the diaphragm and the anode. These substances being heavy do not flow off out of the apparatus under the impelling force of the current, but remain in and around the anode so that when the solution from the outer tank is drawn off they infiltrate under more or less pressure through the coal dust to the bag or other receptacle, upon which they have a very destructive effect.

My present application is based upon a special means for getting rid of these destructive impurities, by providing a channel through and from the anode bag or receptacle, through which they may flow off by reason of their greater specific gravity, and in connection with this feature I have introduced into the construction of the apparatus other improvements therein which are illustrated in the accompanying drawing.

The figure represents in central vertical section my improved apparatus.

A is an iron cathode tank having a tightly fitting cover A', provided with a neck A'', a cock P' at the bottom for drawing off the contents and an aperture in the top provided with a plug P for introducing the solution to be decomposed, usually chloride of sodium, and permitting the escape of hydrogen gas.

B is an anode, preferably composed of powdered carbon and a suitable binding agent. Around the carbon anode is a mass of granulated carbon C, and around this a mass of pulverized coal dust S, held up by a bag Q', the coal dust having been reduced by any known means to such a finely divided condition as to form an impalpable powder, in which condition it makes a diaphragm which is practically amorphous or without pores, and which is impervious to fluids unless under abnormal conditions of pressure or electrolytic transfusion. In assembling these materials, the anode B is inserted into the bag D, and the grains of carbon C are packed in around it. Other materials than carbon may be used in this bag, as for instance, broken glass or sand. The upper edge of the larger bag Q' is then secured by a ring Q to a groove in the interior of the neck A'', and its lower end, which is open, is tied or made fast around the end of a section of ordinary vitrified tile pipe E, that extends through a stuffing-box G, in the bottom of the tank A. The anode and bag D are then introduced into the bag Q' until the bottom of the bag D rests in and closes the flaring or bell mouth of the drain pipe E. The space around the bag D, in the larger bag, is then packed with pulverized anthracite coal, up to the top of the tank. A collar of glass R is then inserted in the neck A'', around the anode, and in the open end of bag D and partially filled with coarse grains of carbon T. A pipe S' for the escape of chlorine gas extends from the mass of carbon grains T through the collar R and neck A''.

The neck of the tank is hermetically sealed with pitch or other suitable material.

The purpose of the bag D is merely to hold the coarse grains of carbon or sand in position while the coal dust is being packed in the bag Q', and said bag is rapidly destroyed by the acids which form around the anode after the current is turned on. To prevent the carbon grains from falling down into the pipe E, I pack the latter with the same material.

In this apparatus the heavy acids and impurities that form in and around the anode are afforded a free downward passage to the pipe E, by which they are carried off as fast as formed. The function of the carbon grains around the anode being to afford a passage for the flow of the acids it will be readily seen that the same object may be secured in many other ways.

What I claim is—

1. In an electrolytic apparatus, the combination with the cathode tank and anode of a closed chamber or compartment containing the anode and formed by a partition composed of or containing a material that renders it substantially non-porous or impervious to fluids under normal conditions, the anode compartment being prolonged below the tank in a drain pipe or passage in which the acids or heavier impurities may collect by gravity, as set forth.

2. The combination of a cathode tank, an anode supported therein, a mass of coal dust around the anode, and a drain pipe or passage from the bottom of the mass of coal dust for carrying off the impurities resulting from chemical action at the anode.

3. The combination of an iron cathode tank, an anode supported therein, a mass of granular carbon or the like surrounding the anode, a diaphragm or partition of pulverized coal confined in a bag and surrounding the granular carbon, and a gravity drain pipe from the bottom of the mass of granular carbon for carrying off the impurities therein resulting from chemical action.

ISAIAH L. ROBERTS.

Witnesses:
ROBT. F. GAYLORD,
PARKER W. PAGE.